July 21, 1953      M. E. GARLOCK      2,645,990
WHEEL STABILIZER MEANS FOR HAND GUIDED GARDEN PLOWS
Filed May 11, 1950
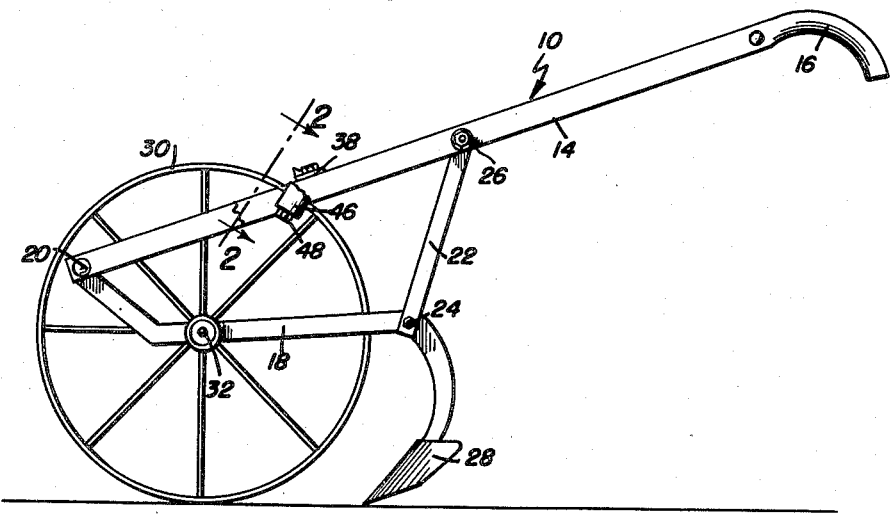
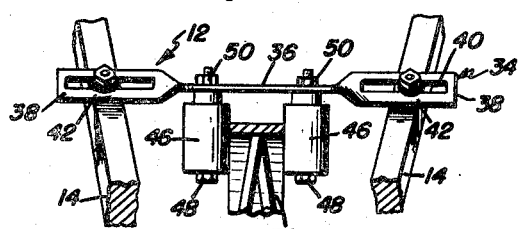
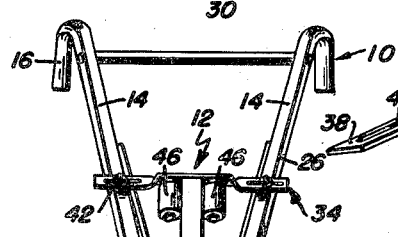
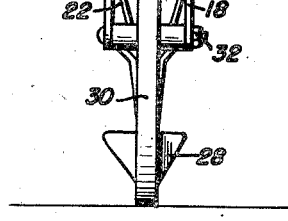
Martin E. Garlock
INVENTOR.
BY *[signatures]*
Attorneys Patented July 21, 1953

2,645,990

UNITED STATES PATENT OFFICE 2,645,990

WHEEL STABILIZER MEANS FOR HAND GUIDED GARDEN PLOWS

Martin E. Garlock, Kirksville, Mo.

Application May 11, 1950, Serial No. 161,316

1 Claim. (Cl. 97—59)

This invention comprises novel and useful improvements in garden plows, and more particularly pertains to a plow having an attachment for laterally stabilizing the ground engaging wheel of the plow, relative to the wheel supporting bars.

An important object of this invention is to provide a garden plow having an attachment thereon which will laterally stabilize the ground engaging wheel to prevent wobbling of the same, when the various parts of the plow become worn or loose, whereby an operator may plow a straight line, with greater ease and facility.

Another important object of this invention is to provide a garden plow wheel stabilizing attachment which will also stabilize the wheel supporting bars relative to each other, and thereby prevent undesirable relative shifting of the wheel support bars which would make operation of the plow difficult.

A further object of this invention is to provide a wheel stabilizing device for plows and the like which device is so constructed that it can be readily attached to various types of wheeled apparatus, which is of simple construction, yet durable and highly efficient for the purpose intended.

An important feature of this invention resides in the provision of a wheel stabilizing arm which is adapted to be secured to the wheel support bars, and a pair of spaced rollers mounted upon the bar and extending radially inwardly towards the wheel, which rollers embrace the sides of the wheel to laterally guide the same.

These, together with various ancillary objects and features, are attained by this device, a preferred embodiment of which has been illustrated by way of example only in the accompanying drawings wherein:

Figure 1 is a side elevational view of a plow with the wheel stabilizer attached, parts being broken away to show the relative positioning of the wheel stabilizer attachment on the support bars;

Figure 2 is a fragmentary perspective view of the wheel stabilizer shown mounted upon the support bars of the plow, and taken substantially on the plane 2—2 of Figure 1;

Figure 3 is a front elevational view of a garden plow having a wheel stabilizing attachment mounted thereon;

Figure 4 is a perspective elevational view of the wheel stabilizer attachment; and Figure 5 is a fragmentary elevational view of a modified form of the stabilizer arm.

It is well known, to those who utilize plows and the like, that the various parts thereof become loose after they have been used for awhile, and consequently the wheel wobbles relative to the wheel support bars, making the plow difficult to guide. However, as the drag upon the plow is considerable, due to the resistance of the soil as the plow passes therethrough, it is apparent that the wheel stabilizer must be so constructed that it will not materially enhance the drag of the plow, and yet laterally guide the wheel. It is accordingly a desideratum of this invention to provide a wheel stabilizing device, which is adapted to be attached to a plow, which will not increase the drag of the plow.

Referring now more specifically to the accompanying drawings wherein like numerals designate similar parts throughout the various views, it will be seen, by reference to Figure 1 of the drawings, that there is provided a plow indicated generally by the numeral 10 upon which is mounted a wheel stabilizing device, indicated generally by the numeral 12.

The plow consists generally of a pair of forwardly converging wheel supporting bars or handles 14, which are conventionally provided with grip portions 16 on one end thereof. A pair of brace members 18, are each secured, at their forward ends, to the forward end of the wheel supporting bars 14, as by the fastening bolts 20, the rear ends of the braces being attached, as by the straps 22, and suitable fasteners 24 and 26 to the supporting bars 14, intermediate the ends thereof. A conventional plow 28 depends from the brace 18, which plow may be of any desired configuration.

A ground engaging wheel 30 is rotatably supported between the brace members 18, upon the transversely extending shaft 32.

In order to stabilize the wheel 30, relative to the support bars 14, and also to stabilize the support bars relative to each other, there is provided an arm or bar 34 which includes an intermediate portion 36 and a pair of longitudinally twisted end portions 38. In order to permit the arm 34 to be attached to various types of existing plows, in which the relative spacing of the support bars may vary, the end portions 38 are longitudinally slotted as at 40 so that the arm fastening bolts 42, which mount the arm upon the support bars, may extend therethrough. Alternatively, the end portions 38 may be provided with a plurality of longitudinally spaced bores 44, as best shown in Figure 5 of the drawings, which bores receive the fastening bolts 42, and prevent the arm 34 from sliding relative to the support bars 14, even when the fastening bolts are not in firm engagement therewith.

As previously stated, the end portion 38 of the arm 34 is longitudinally twisted, and it is intended that the amount of the twist be such that the mid-portion 36 of the arm will lie substantially parallel to the periphery of the wheel 30, when the end portions are in seating engagement on the support bars 14. A pair of rollers 46, are each rotatably journaled on shafts 48, which shafts are secured to the mid-portion 36 of the arm 34, as by the nuts 50. In order to accommodate various sized wheels, it is intended that the rollers 46 be longitudinally adjustably mounted upon the mid-portion 36 of the arm 34, and for this purpose the mid-portion is provided with a pair of longitudinally extending slots 52 through which the shaft 48 extends.

It will thus be seen that there is provided an attachment for wheeled garden plows, which will laterally stabilize the wheel, without increasing the drag thereof, and also serve to stabilize the support bars relative to each other. It is to be understood however that the stabilizing attachment 12 may be utilized in other wheeled vehicles, such as wheelbarrows and the like, without departing from the spirit of this invention.

From the foregoing, it is thought that the operation and construction of the device will be readily understood, and further discussion is therefore believed to be unnecessary. However, numerous modifications will readily occur to those skilled in the art after a consideration of the foregoing specification and accompanying drawing, it is not intended to limit the invention to that shown and described, but all suitable modifications may be resorted to falling within the scope of the appended claim.

Having described the invention, what is claimed as new is:

The combination with a garden plow of the type including a pair of forwardly converging handles and a ground wheel journaled between the forward end portions thereof, of a wheel stabilizer comprising a transverse metallic bar adjacent the wheel and including twisted end portions overlying intermediate portions of the handles and having longitudinal slots therein, bolts engaged in the slots for adjustably securing the bar on the handles, said bar further having longitudinally spaced slots in its intermediate portion, shafts adjustably mounted in the last named slots and depending from the bar on opposite sides of the wheel, and rollers journaled on said shafts and engaged with the wheel for laterally supporting same.

MARTIN E. GARLOCK.

References Cited in the file of this patent

UNITED STATES PATENTS

| Number | Name | Date |
|---|---|---|
| 270,076 | James | Jan. 2, 1883 |
| 592,519 | Gray | Oct. 26, 1897 |
| 817,677 | Smith | Apr. 10, 1906 |
| 1,108,759 | Johnson | Aug. 25, 1914 |
| 1,689,747 | Olson | Oct. 30, 1928 |

FOREIGN PATENTS

| Number | Country | Date |
|---|---|---|
| 3,408 | France | Sept. 1, 1904 |